Sept. 21, 1965 R. BOGGILD ETAL 3,207,031
PROJECTOR FOR SELECTIVELY PROJECTING IMAGES
OF OPAQUE OBJECTS AND TRANSPARENCIES
Filed Nov. 21, 1960 2 Sheets-Sheet 1

INVENTORS
ROBERT BOGGILD
WILLIAM L. DALE
BY
Des Jardins, Robinson, Tritle + Schenk
ATTORNEYS Sept. 21, 1965 R. BOGGILD ETAL 3,207,031
PROJECTOR FOR SELECTIVELY PROJECTING IMAGES
OF OPAQUE OBJECTS AND TRANSPARENCIES
Filed Nov. 21, 1960 2 Sheets-Sheet 2

INVENTORS
ROBERT BOGGILD
WILLIAM L. DALE
BY

ATTORNEYS

United States Patent Office 3,207,031
Patented Sept. 21, 1965

3,207,031
PROJECTOR FOR SELECTIVELY PROJECTING IMAGES OF OPAQUE OBJECTS AND TRANSPARENCIES
Robert Boggild, 5463 Hill and Dale Drive, and William L. Dale, 197 Ireland Ave., both of Cincinnati, Ohio
Filed Nov. 21, 1960, Ser. No. 70,582
4 Claims. (Cl. 88—26)

The present invention relates to apparatus for the projection of images and more particularly to improved apparatus for the projection of images from either transparent or opaque objects.

Devices of this general type are known but the prior art devices have been relatively complicated and, hence expensive. Accordingly, it is an object of the present invention to provide an improved apparatus which is of relatively simple construction and in which a single coaxial lens system is employed for the projection of images from either transparent or opaque objects, is of relatively simple construction and is inexpensive to manufacture.

In general, the invention contemplates the provision of a simple means in projection apparatus whereby light from a suitable source may be selectively directed to an opaque object and then through a lens system or, alternatively, the light from the source may be directed from the source through an image of a transparency, either film or slides, and then through the lens system. In accordance with the invention, a single lens system is employed which is provided with relatively simple means for effecting a change in the focal length of the lens system.

Other objects and advantages will be apparent to those skilled in the art from the following description taken in connection with the accompanying drawings in which:

FIG. 1 is a perspective view of projection apparatus in accordance with the invention;

FIG. 2 is a side sectional elevation of one embodiment of the apparatus illustrated in FIG. 1, the movable reflector being illustrated in position for the projection of images of opaque objects by solid lines, and in position for the projection of transparencies by dotted lines; and the movable lens being illustrated in position for the projection of images from the transparencies by solid lines, and in position for projection of images from opaque objects by dotted lines;

Figure 1:
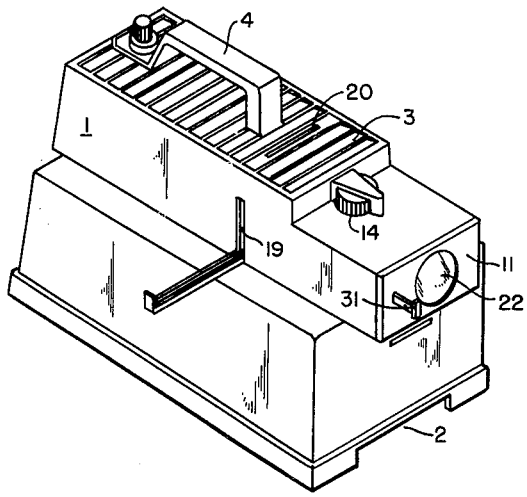

Referring now to FIGS. 1-4, the projection apparatus comprises a housing 1 provided with air inlet openings 2 near the bottom thereof and vent openings 3 at the top thereof. Housing 1 is provided with a handle 4 to provide ease in portability of the projection apparatus. Secured to the interior of housing 1 is a socket 5 which receives and supports a light source 6. In the embodiment illustrated in FIG. 2, light source 6 is an ordinary household type of light bulb preferably of about 100-watt rating. A suitable switch 7 is provided for controlling the operation of the light source 6.

Housing 1 is provided with a floor portion 8 which extends generally across the bottom of the housing, with the exception of an open area 9 which is placed in registry and over an opaque object when it is desired to project an image thereof.

To insure that light from the light source 6 is effectively and efficiently directed onto such an opaque object resting beneath opening 9, and for other reasons which will appear as the description proceeds, there is provided a mirror 10 which reflects light received from the source 6 by way of the opaque object resting beneath opening 9 into the lens system of the apparatus. The lens system is designated generally at 11, and is provided with focusing means comprising rack 12, pinion 13 meshing therewith, and a focusing knob 14.

Figure 2:
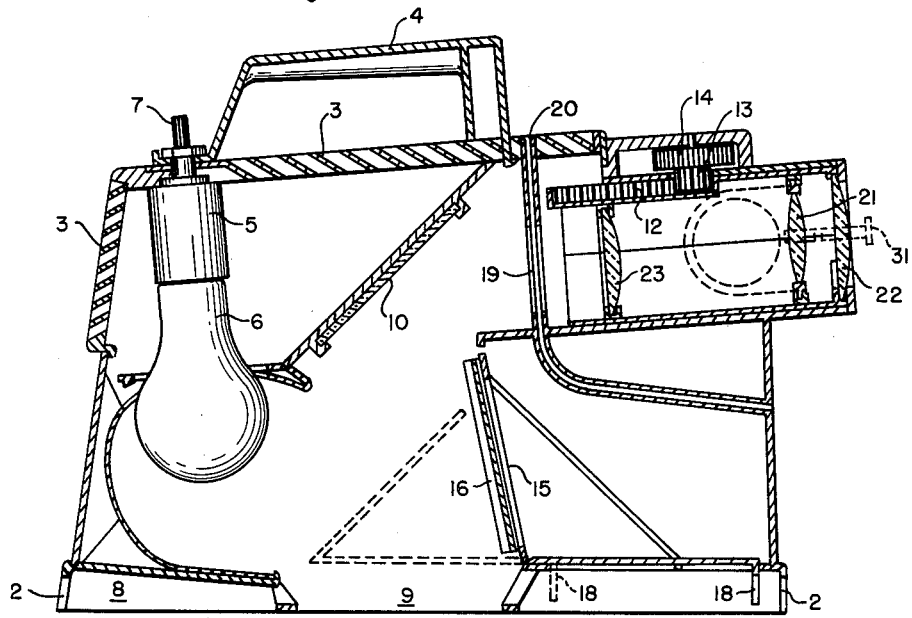
Figure 3:
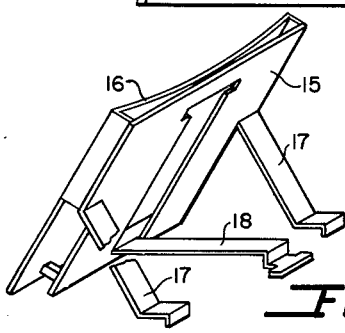
FIG. 3 is a perspective detailed view of the movable reflector.

Referring now to FIGS. 2, 3, a movable reflector 15 is disposed within housing 1 in the position shown in full lines in FIG. 2 and is movable to at least two different positions illustrated by the solid lines and the dotted lines in FIG. 2.

As illustrated in the drawings, the movable reflector 15 includes a mirror 16 and its movable support 17. The support 17 is best illustrated in FIG. 3, a portion 18 of the support 17 extending below housing 1 (FIG. 2) so that the reflector may be moved readily, in accordance with the will of an operator, from the position shown in the full lines in FIG. 2 to the dotted line position indicated in FIG. 2.

As illustrated in FIG. 3, mirror 16 is curved in reference to its longitudinal axis so that it reflects an elongated image of the light source, thereby providing a more even distribution of light for the projection of images from transparencies.

Housing 1 is provided with suitable slots 19, 20 and corresponding supporting structures to permit the insertion of strip film, a slide holder, or a strip film holder, as desired when the improved projector is utilized to project film transparencies as contrasted to opaque objects.

In addition to the focusing means 12, 13, 14, referred to above, it will be appreciated by those skilled in the art that the lens system 11 requires a different focal length for the projection of an opaque object as compared to that which is required for the projection of an image from a film transparency. This is accomplished in accordance with the present invention by the provision of a novel and improved auxiliary lens 21 so supported and arranged that it may be conveniently moved into or out of operating relationship with conventionally supported or fixed lenses 22, 23 of lens system 11.

Figure 4:
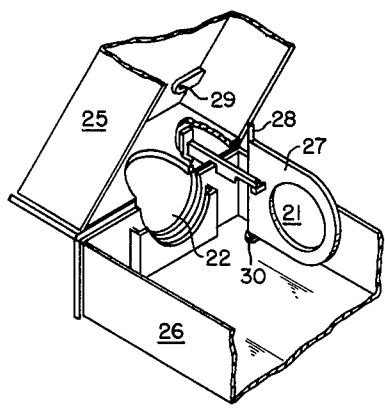
FIG. 4 is a fragmentary perspective detailed view of a portion of the lens housing and illustrating the construction of the movable parts thereof.

Referring now to FIG. 4, operatively associated with and supported by housing 1, is another housing portion, designated generally at 24 and comprising hinged upper and lower portions 25, 26. The auxiliary or movable lens 21 is supported in a suitable holder 27 having oppositely disposed shaft-like projections 28 extending upwardly and downwardly therefrom and received by inwardly projecting portions 29, 30 of lower box portion 26 and upper portion 25, respectively. This auxiliary or movable lens 21 is pivotally supported for limited rotation by said projections 29, 30. Connected to support 27 is an operating lever 31 which projects forwardly and extends through the forward end portion of the lens box so that an operator, by manipulation of lever 31, can at will move the auxiliary lens 21 into or out of operative relationship with lenses 22, 23. In operation, if it is desired to project an opaque object, the opening 9 is placed over such object. The downwardly projecting portion 18 of the reflector support is moved to its forward position, that is, to the right in FIG. 2 so that the movable reflector 15 is in the position indicated by the solid lines in that figure. For the projection of opaque objects, the auxiliary or movable lens 21 is placed out of operative relationship with lenses 22, 23 by pushing lever 31 to the rear (to the left dotted line position in FIG. 2) so that lens 21 assumes a position as indicated in FIG. 4. The improved projector is connected to a suitable source of energy. The light source is then energized by manipulation of switch 7 and light emanating from source 6 is then directed to the opaque object placed beneath opning 9 and is reflected from said object to mirror 10 and then through lenses 22, 23, focusing if necessary being effected by adjustment of knob 14. Of course, during the projection of opaque objects, the slide holder, strip film holder, as well at any slides or strip film should be removed from slots 19, 20.

If it is desired to project images from film-type transparencies instead of opaque objects, the downwardly projecting portion 18 of the movable reflector is moved to the rear (to the left) in FIG. 2 so that reflector 15 is moved to the position indicated by the dotted lines in that figure. Lever 31 is pulled forward, to the right in FIG. 2 so that auxiliary or movable lens 21 is swung into operative relationship with lenses 22, 23. With the various movable elements of the projector being thus arranged, upon insertion of either slides or film, into the appropriate one of slots 19, 20, light emanating from source 6 is reflected by reflector 15 to mirror 10 and then through lens 23, then through movable lens 21, and finally through lens 22 (solid lines, FIG. 2).

Thus it will be seen that our novel and improved projector is quite simple in construction, and is easily convertible for use in the projection of various types of objects including opaque objects and images from film transparencies.

While a particular embodiment of the invention has been illustrated and described, it will be obvious to those skilled in the art that various changes and modifications may be made without departing from the invention and we intend in the oppended claims to cover all such changes and modifications that fall within the true spirit and scope of the invention.

Having thus described our invention, what we claim is new and useful and desire to secure by United States Letters Patent, is:

1. In a projector for selectively projecting images of opaque objects and transparencies, a housing having an opening in the undersurface thereof beneath which an opaque object may be placed, a single adjustable lens system mounted on said housing and projecting forwardly therefrom, a mirror mounted within said housing to the rear of said lens system in an inclinded position overlying the opening in the undersurface of said housing, said mirror acting to reflect an image directly from an opaque object placed beneath said opening to said lens system, a light source mounted within said housing rearwardly of said mirror so as to be shielded from said mirror and yet positioned to illuminate an object placed beneath said opening, a movable reflector mounted within said housing, support means mounting said reflector for movement from a first position of use in which said reflector overlies the opening in said housing and is inclined relative to said light source and said mirror so as to reflect light directly from said light source to said mirror, to a second position of use in which said reflector extends upwardly from a side edge of said opening and is inclined relative to said light source and said opening so that light from said light source will be reflected downwardly through said opening, and means intermediate said mirror and said lens system for receiving a transparency to be projected when said reflector is in its first position of use.

2. The projector claimed in claim 1 wherein said lens system includes a displaceable lens member for adjusting the focal length of said lens system, and means pivotally mounting said displaceable lens member for movement from an operative to an inoperative position.

3. The projector claimed in claim 1 wherein said reflector is curved in reference to its longitudinal axis.

4. The projector claimed in claim 1 wherein the support means mounting said reflector for movement from one position to the other includes a gripping portion extending downwardly from said housing by means of which the user may move said reflector.

References Cited by the Examiner

UNITED STATES PATENTS

| 803,385 | 10/05 | Wynne | 88—24 |
| 908,560 | 1/09 | Goodrich | 88—26 |
| 1,879,737 | 9/32 | Riccio | 88—24 |
| 1,904,695 | 4/33 | Plies | 88—24 |

LEO SMILOW, *Primary Examiner.*

EMIL G. ANDERSON, *Examiner.*